US010101880B2

(12) United States Patent
Sellam et al.

(10) Patent No.: US 10,101,880 B2
(45) Date of Patent: Oct. 16, 2018

(54) TOOLS ON-DEMAND

(71) Applicant: SAP SE, Walldorf (DE)

(72) Inventors: Karima Sellam, Levallois-Perret (FR); Arnaud Nouard, Levallois-Perret (FR)

(73) Assignee: SAP SE, Walldorf (DE)

( * ) Notice: Subject to any disclaimer, the term of this patent is extended or adjusted under 35 U.S.C. 154(b) by 443 days.

(21) Appl. No.: 14/943,034

(22) Filed: Nov. 17, 2015

(65) Prior Publication Data

US 2017/0139552 A1    May 18, 2017

(51) Int. Cl.
*G06F 3/048*     (2013.01)
*G06F 3/0482*    (2013.01)
*G06F 3/0484*    (2013.01)
*G06F 17/24*     (2006.01)
*G06F 17/22*     (2006.01)

(52) U.S. Cl.
CPC ........ *G06F 3/0482* (2013.01); *G06F 3/04842* (2013.01); *G06F 17/2247* (2013.01); *G06F 17/246* (2013.01)

(58) Field of Classification Search
CPC .............. G06F 3/0482; G06F 3/04842; G06F 17/2247; G06F 17/246
USPC ........................................................ 715/810
See application file for complete search history.

(56) References Cited

U.S. PATENT DOCUMENTS

| | | | | |
|---|---|---|---|---|
| 6,535,230 B1* | 3/2003 | Celik | ................. | G06F 3/0486 715/769 |
| 8,701,030 B2* | 4/2014 | Lyons | ................. | G06F 3/0486 709/213 |
| 9,612,732 B2* | 4/2017 | Donahue | ............. | G06F 3/04845 |
| 9,930,167 B2* | 3/2018 | Bruno | ............... | H04M 1/72547 |
| 2016/0006856 A1* | 1/2016 | Bruno | ............... | H04M 1/72547 715/809 |
| 2016/0063006 A1* | 3/2016 | Belogolov | .......... | G06F 17/3064 707/767 |
| 2016/0139776 A1* | 5/2016 | Donahue | ............. | G06F 3/04845 715/781 |
| 2017/0154055 A1* | 6/2017 | Dimson | ............ | G06F 17/30256 |
| 2017/0316102 A1* | 11/2017 | Saito | ................. | G06F 17/30867 |

* cited by examiner

*Primary Examiner* — David Phantana-angkool
(74) *Attorney, Agent, or Firm* — Klarquist Sparkman, LLP

(57) ABSTRACT

A framework for improving user interfaces, and menu systems in particular, is described herein. In one embodiment, a search bar is introduced to the user interface in addition to, or to the exclusion of, menu system components. By reducing or eliminating the need for a persistent menu system UI, screen real-estate is made available for other content displayed by the application. In one embodiment, a user desiring to access functionality exposed by the application enters search text into the search bar. A list of search results is displayed, the list including actions—pieces of functionality exposed by the application—and/or traditional menu system components including menus, context menus, toolbars, pop-ups, widgets, buttons, and the like.

20 Claims, 7 Drawing Sheets

| | A | B | C | D | E |
|---|---|---|---|---|---|
| 1 | Key | User Name | Address | Quantity Sold | Margin |
| 2 | 1245 | bobg | 123 Main St., Anytown, USA | 32,768 | $ 2,333,234 |
| 3 | 1645 | cindys | 321 Dorchester St., Wheaton, IL | 2,048 | $ 456,456 |
| 4 | 1646 | margeb | 742 Evergreen Terrace, Springfield, OR | 10,000 | $ 765,876 |
| 5 | 4545 | ladyf | 1600 Pennsylvania Ave., Washington DC | 65,536 | $ 5,004,324 |
| 6 | 5353 | dennisc | 42 Anywhere Lane, Boston MA | 31,415 | $ 1,988,332 |
| 7 | 6998 | drewc | 443 Union St., Santa Clara CA | 2 | $ 42 |
| 8 | 7353 | arjunb | 555 105$^{th}$ Ave, Kirkland WA | 0 | $ 0 |
| 9 | 9999 | johns | 678 44$^{th}$ St., Pinkerton MA | 3332 | $ 23,234 |
| 10 | 10000 | samuelf | 7000 Rose Ave, Flowerton PA | 3745 | $ 43,424 |
| 11 | 3456 | williame | 8000 Lilac St., Flowerton PA | 5888 | $ 152,342 |
| 12 | 4567 | theodorew | 9443 Lily Dr., Flowerton PA | 2554 | $ 32,443 |
| 13 | 5678 | thomasf | 8542 East Way, Westward, NV | 14 | $ 543 |
| 14 | 6789 | debrai | 2504 Hollywood Blvd., Los Angeles CA | 26878 | $ 865,432 |

Fig. 4 400

Actions

| | A | B | C | D | E |
|---|---|---|---|---|---|
| 1 | Key | User Name | Address | Quantity Sold | Margin |
| 2 | 1245 | bobg | 123 Main St., Anytown, USA | 32,768 | $ 2,333,234 |
| 3 | 1645 | cindys | 321 Dorchester St., Wheaton, IL | 2,048 | $ 456,456 |
| 4 | 1646 | margeb | 742 Evergreen Terrace, Springfield, OR | 10,000 | $ 765,876 |
| 5 | 4545 | ladyf | 1600 Pennsylvania Ave., Washington DC | 65,536 | $ 5,004,324 |
| 6 | 5353 | dennisc | 42 Anywhere Lane, Boston MA | 31,415 | $ 1,988,332 |
| 7 | 6998 | drewc | 443 Union St., Santa Clara CA | 2 | $ 42 |
| 8 | 7353 | arjunb | 555 105$^{th}$ Ave, Kirkland WA | 0 | $ 0 |
| 9 | 9999 | johns | 678 44$^{th}$ St., Pinkerton MA | 3332 | $ 23,234 |
| 10 | 10000 | samuelf | 7000 Rose Ave, Flowerton PA | 3745 | $ 43,424 |
| 11 | 3456 | williame | 8000 Lilac St., Flowerton PA | 5888 | $ 152,342 |
| 12 | 4567 | theodorew | 9443 Lily Dr., Flowerton PA | 2554 | $ 32,443 |
| 13 | 5678 | thomasf | 8542 East Way, Westward, NV | 14 | $ 543 |

*Fig. 5* 500

| | | | | | |
|---|---|---|---|---|---|
| Action: Format (524, 520) | | | | | |
| Format the cell as red ← 536 | | | | | |
| Format the cell as blue | | | | | |
| Format the cell as green | | | | | |
| More... | | | | | |

518

| | A | B | C | D | E |
|---|---|---|---|---|---|
| 1 | Key | User Name | Address | Quantity Sold | Margin |
| 2 | 1245 | bobg | 123 Main St., Anytown, USA | 32,768 | $ 2,333,234 |
| 3 | 1645 | cindys | 321 Dorchester St., Wheaton, IL | 2,048 | $ 456,456 |
| 4 | 1646 | margeb | 742 Evergreen Terrace, Springfield, OR | 10,000 | $ 765,876 |
| 5 | 4545 | ladyf | 1600 Pennsylvania Ave., Washington DC | 65,536 | $ 5,004,324 |
| 6 | 5353 | dennisc | 42 Anywhere Lane, Boston MA | 31,415 | $ 1,988,332 |
| 7 | 6998 | drewc | 443 Union St., Santa Clara CA | 2 | $ 42 |
| 8 | 7353 | arjunb | 555 105th Ave, Kirkland WA | 0 | $ 0 |
| 9 | 9999 | johns | 678 44th St., Pinkerton MA | 3332 | $ 23,234 |

(Labels: 526, 528, 530, 532, 534)

| | A | B | C | D | E |
|---|---|---|---|---|---|
| 1 | Key | User Name | Address | Quantity Sold | Margin |
| 2 | 1245 | bobg | 123 Main St., Anytown, USA | 32,768 | $ 2,333,234 |
| 3 | 1645 | cindys | 321 Dorchester St., Wheaton, IL | 2,048 | $ 456,456 |
| 4 | 1646 | margeb | 742 Evergreen Terrace, Springfield, OR | 10,000 | $ 765,876 |
| 5 | 4545 | ladyf | 1600 Pennsylvania Ave., Washington DC | 65,536 | $ 5,004,324 |
| 6 | 5353 | dennisc | 42 Anywhere Lane, Boston MA | 31,415 | $ 1,988,332 |
| 7 | 6998 | drewc | 443 Union St., Santa Clara CA | 2 | $ 42 |
| 8 | 7353 | arjunb | 555 105th Ave, Kirkland WA | 0 | $ 0 |
| 9 | 9999 | johns | 678 44th St., Pinkerton MA | 3332 | $ 23,234 |
| 10 | 10000 | Samuelf | 7000 Rose Ave, Flowerton PA | 5745 | $ 43,424 |
| 11 | 3456 | williame | 8000 Lilac St., Flowerton PA | 5888 | $ 152,342 |
| 12 | 4567 | theodorew | 9443 Lily Dr., Flowerton PA | 2554 | $ 32,443 |
| 13 | 5678 | thomasf | 8542 East Way, Westward, NV | 14 | $ 543 |
| 14 | 6789 | debral | 2504 Hollywood Blvd., Los Angeles CA | 26878 | $ 865,432 |

Fig. 9 900

Action: Format

Font | Border | Cell

Arial | 8 | A A — 950

952 — Choose A Color

Style | Numb

B I U | Color ...

Alignment | Size

946 | 956 | 954

| | A | B | C | D | E |
|---|---|---|---|---|---|
| 1 | Key | User Name | Address | Quantity Sold | Margin |
| 2 | 1245 | bobg | 123 Main St., Anytown, USA | 32,768 | $ 2,333,234 |
| 3 | 1645 | cindys | 321 Dorchester St., Wheaton, IL | 2,048 | $ 456,456 |
| 4 | 1646 | margeb | 742 Evergreen Terrace, Springfield, OR | 10,000 | $ 765,876 |

| | A | B | C | D | E |
|---|---|---|---|---|---|
| 1 | Key | User Name | Address | Quantity Sold | Margin |
| 2 | 1245 | bobg | 123 Main St., Anytown, USA | 32,768 | $ 2,333,234 |
| 3 | 1645 | cindys | 321 Dorchester St., Wheaton, IL | 2,048 | $ 456,456 |
| 4 | 1646 | margeb | 742 Evergreen Terrace, Springfield, OR | 10,000 | $ 765,876 |
| 5 | 4545 | ladyf | 1600 Pennsylvania Ave., Washington DC | 85,536 | $ 5,004,324 |
| 6 | 5353 | dennisc | 42 Anywhere Lane, Boston MA | 31,415 | $ 1,988,332 |
| 7 | 6998 | drewc | 443 Union St., Santa Clara CA | 2 | $ 42 |
| 8 | 7353 | arturob | 555 105th Ave, Kirkland WA | 0 | $ 0 |
| 9 | 9999 | johns | 678 44th St., Pinkerton MA | 3332 | $ 23,234 |
| 10 | 10000 | samuelf | 7000 Rose Ave, Flowerton PA | 3745 | $ 43,424 |
| 11 | 3456 | williamg | 8000 Lilac St., Flowerton PA | 5568 | $ 152,342 |
| 12 | 4567 | theodorew | 9443 Lily Dr., Flowerton PA | 2554 | $ 32,443 |
| 13 | 5678 | thomasf | 8542 East Way, Westward, NV | 14 | $ 543 |
| 14 | 6789 | debral | 2504 Hollywood Blvd., Los Angeles CA | 26878 | $ 865,432 |

TOOLS ON-DEMAND

BACKGROUND

Software often includes a menu system as part of a user interface (UI), including some combination of menus, context menus, toolbars, pop-ups, widgets, buttons, and the like. Software for performing involved tasks, such as editing and/or authoring of content, often provides a large amount of functionality, but at the cost of a complex menu system.

Menu systems are challenging to navigate, as functionality can be deeply nested within a cascade of menus and pop-ups. Furthermore, functionality discoverability is difficult, as the terminology employed by the user interface may not match the expectations of the end user. Moreover, even if a user knows a particular piece of functionality exists, they frequently forget where in a menu system the desired functionality can be found. Overly complex menu systems are such a problem that software designers often intentionally limit the functionality of the software they produce in order to achieve a simpler, more stream-lined menu system.

Persistently displayed menu systems take up valuable screen "real-estate". While all form-factors are affected, the loss is particularly acute on handheld and mobile devices, such as touch-screen phones, tablets, and the like. In some cases, entire classes of functionality, such as editing and authoring, is impractical on these smaller form factor devices.

Therefore, there is a need for an improved framework that addresses the abovementioned challenges.

SUMMARY

A framework for improving user interfaces, and menu systems in particular, is described herein. In one embodiment, a search bar is introduced to the user interface in addition to, or to the exclusion of, menu system components. By reducing or eliminating the need for a persistent menu system UI, screen real-estate is made available for other content displayed by the application. In one embodiment, a user desiring to access functionality exposed by the application enters search text into the search bar. A list of search results is displayed, the list including actions—pieces of functionality exposed by the application—and/or traditional menu system components including menus, context menus, toolbars, pop-ups, widgets, buttons, and the like.

In one embodiment, the search bar appears in response to a user selecting a UI component, and search results are determined in part based on the type of selected UI component. For example, a user may select a column in a spreadsheet application, causing the search bar to appear. If the user enters "sort" as search text, the search results may include actions such as "sort ascending", "sort descending", and/or other sort commands particular to a spreadsheet column. In another embodiment, details about the selected UI component may be considered when generating search results, such as the type of data contained in the spreadsheet column In the case of numeric data, search results may include actions such as "sort numeric", "sort alphabetic", "sort absolute", and the like. In one embodiment, the search results may include a traditional sort widget, inline, allowing the user more complete control over sorting options. Once the user invokes the desired action, the search bar disappears, allowing more non-menu system content to be displayed.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 3 is a user interface illustrating a software application without a traditional menu system;

FIG. 4 is a user interface illustrating a software application with a selected UI component and search bar;

FIG. 5 is a user interface illustrating user-entered search text and suggested actions in a search results box;

FIG. 6 is a user interface illustrating the result of applying a format action to a selected spreadsheet column;

FIG. 9 is a user interface illustrating a color picker widget displayed as a result of a user interaction with a menu system component embedded in the search results;

FIG. 10 is a user interface illustrating the result of selecting a color from the color picker widget.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

Figure 1:
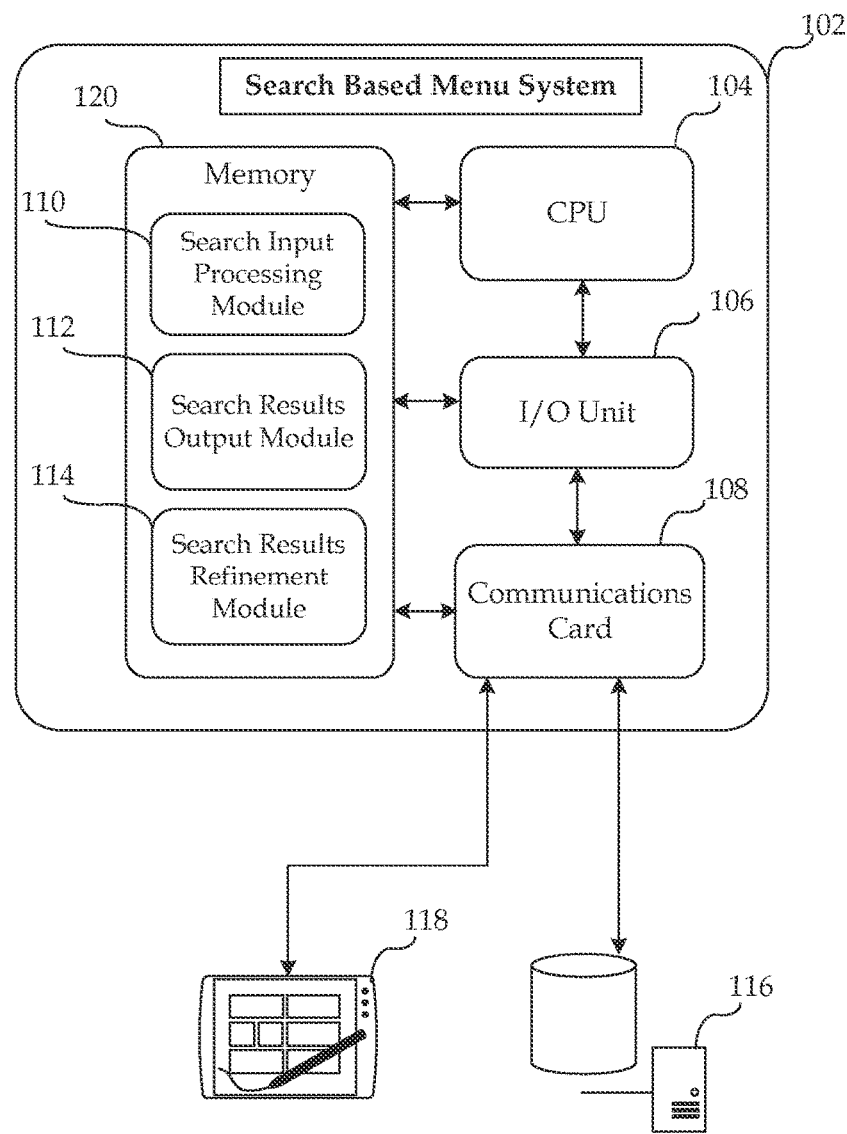
FIG. 1 is a block diagram illustrating an exemplary architecture.

FIG. 1 is a block diagram illustrating an exemplary architecture 100 that may be used to implement the search-based menu system described herein. Generally, architecture 100 may include a search based menu system 102, a data repository 116, and an end user device 118. It should be appreciated that the present framework is described in the context of a menu system for the purposes of illustration only. The present framework may also be applied to other software UI metaphors, including custom user interfaces.

The search based menu system 102 can be any type of computing device capable of responding to and executing instructions in a defined manner, such as a workstation, a server, a portable laptop computer, another portable device, a touch-based tablet, a smart phone, a mini-computer, a mainframe computer, a storage system, a dedicated digital appliance, a device, a component, other equipment, or a combination of these. The system may include a central processing unit (CPU) 104, an input/output (I/O) unit 106, a memory module 120 and a communications card or device 108 (e.g., modem and/or network adapter) for exchanging data with a network (e.g., local area network (LAN) or a wide area network (WAN)). It should be appreciated that the different components and sub-components of the system may be located on different machines or systems. Memory module 120 may include search input processing module 110, search results output module 112, and search results refinement module 114.

The search based menu system 102 may be communicatively coupled to one or more other computer systems or devices via the network. For instance, the system may further be communicatively coupled to one or more data repository 116 and/or end user device 118. The data repository 116 may be, for example, any database (e.g., relational database, in-memory database, etc.), an entity (e.g., set of related records), or a data set included in the database. In some implementations, the database server serves to store associations between search terms and suggested actions, user data including prior search history, search refinement parameters, user preferences, and so forth. In one embodiment, software components create, manipulate, and delete entries in the data repository in the course of user interaction with a search-based menu system.

The end user device 118 may be a tablet computer, mobile phone, desktop computer, laptop computer, smart watch, or any other type of computing device capable of receiving user input and displaying content. In one embodiment, the search based menu system 102 operates as a server or cloud based application, with which end user device 118 communicates to perform the steps described herein. In another embodiment, the functionality of the end user device 118 is performed by the search based menu system 102, e.g., when the search based menu system is implemented by an "app" running on a smart phone, or as an installed piece of software running on a desktop computer, or the like.

Search input processing module 110 includes a logic for receiving and processing user input related to the search based menu system. In one embodiment, a search bar is displayed in response to a user selection of a UI component. A series of characters is received from the search bar, and on or more actions are determined based on the received series of characters and the type and/or content of the selected UI component.

Search results module 112 includes a logic for presenting to the end user a list of one or more suggested actions. In one embodiment, upon being selected, an action is executed immediately, causing the desired effect in the application. In another embodiment, upon being selected, a menu system UI component, such as widget, pop-up window, or the like is displayed, allowing the end user the full range of actions available for the selected UI component.

Search results refinement module 114 includes a logic for identifying trends and patterns in search-based menu usage, optionally storing data derived from the trends and patterns in data repository 116, and using the trends and patterns to refine future search results. For example, if a user frequently, or most recently, selected a "sort descending" action upon entering "sort" as a search query, search results refinement module 114 may, in one embodiment, cause search results output module 112 to list "sort descending" at the top of the list of search results.

Figure 2:
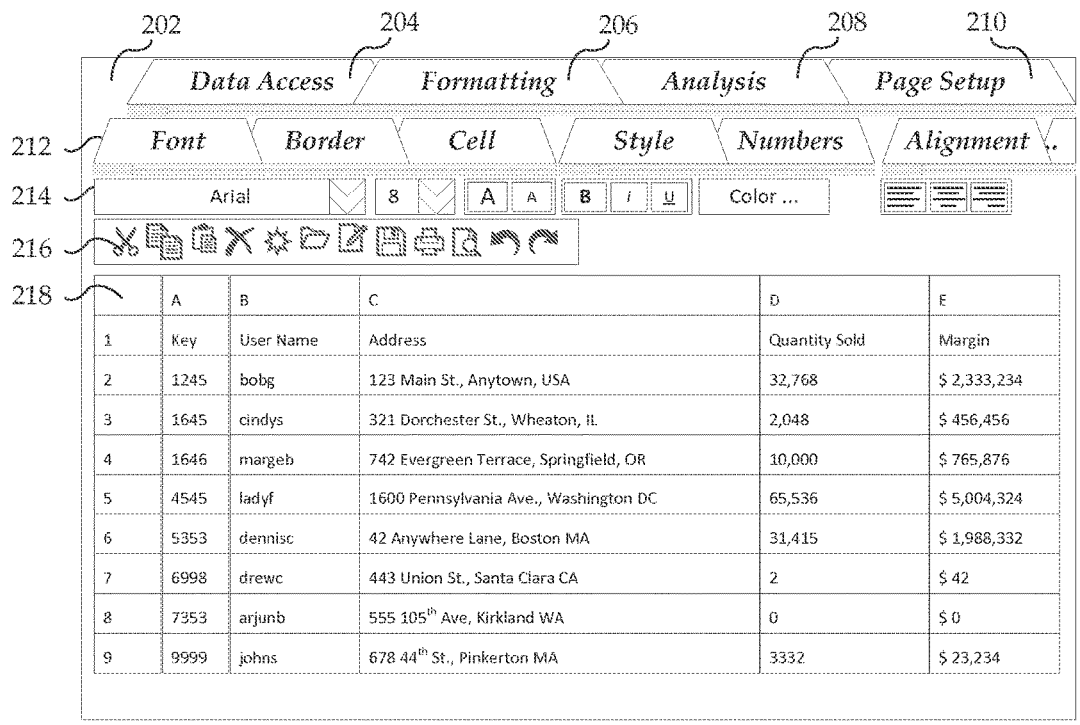
FIG. 2 is a user interface illustrating a prior art complex menu system in a spreadsheet application.

FIG. 2 is a user interface 200 illustrating a prior art complex menu system in a spreadsheet application. While FIG. 2 depicts a prior art menu system in the context of a spreadsheet application, any type of software and any type of menu system is similarly contemplated, including word processors, web browsers, media players, and the like.

FIG. 2 depicts a tabbed-based menu system 202, including a top level tab group that includes data access tab 204, formatting tab 206 (selected), analysis tab 208, and page setup tab 210. Beneath the top level tab group is a set of three child tab groups 212. The leftmost tab group includes a Font tab (selected), a Border tab, and a Cell tab. The middle child tab group includes a Style tab (selected) and a Numbers tab. The rightmost child tab group includes an Alignment tab (selected), and additional tabs that are cropped by the edge of the screen.

Each of the child tab groups is associated with one or more of sub-menus 214. For example, the leftmost child tab group includes a font picker drop-down UI component (currently set to Arial), a font size drop-down UI component (currently set to 8), and a font size increaser/decreaser UI component. The middle child tab group (Style & Numbers) is associated with a font style picker (e.g., for setting Bold, Italics, and/or Underline), and a color picker. The rightmost child tab group (Alignment, . . . ) is associated with the text alignment selector, i.e. for setting text to be left, center, or right justified. Each of these sub-menus are exemplary— more, fewer, and/or different menu contents are similarly contemplated, as are different types of menus.

Menu 216 depicts a typical short-cut menu found in many desktop and mobile applications, enabling a user to cut, copy, paste, open, save, print, etc. Spreadsheet content 218 depicts a sample spreadsheet, spanning columns A-E and rows 1-9. As will be made more clear when describing aspects of the invention, spreadsheet content 218 is allowed less screen real-estate due to the persistent menu UI components 204-216.

FIG. 3 is a user interface 300 illustrating a software application without a traditional menu system. Instead, although currently not visible, FIG. 3 illustrates how search-based menu system 302 is rendered when a UI component is not selected. As such, spreadsheet content 318 is enabled to span rows 1-14, providing significantly more content, and without the distracting, confusing, and rarely used menu components of FIG. 2.

FIG. 4 is a user interface 400 illustrating a software application with a selected UI component and search bar. In one embodiment, the selected UI component is column D of spreadsheet content 418. In one embodiment, an end user selects column D of spreadsheet content 418, although column D could have been selected through automation, random clicking, or any other mechanism.

In one embodiment, search bar 420 is displayed in response to the selection of a UI component, in this case column D. As depicted, the search bar may appear at the top of the screen, displacing some non-menu content, but allowing much of the non-menu content to remain visible. However, the search bar may appear anywhere on the screen, e.g., at the bottom of the screen, on the side of the screen, in a tab-column that also appears in response to the selection of the UI component, and the like. Alternatively, search bar 420 may partially or completely obscure underlying content.

In another embodiment, search bar 420 appears in response to a hot-key or other input sequence, independent of a UI component being selected. In this mode, search text is evaluated against a global set of commands, such as "Save", "Exit", and the like.

In one embodiment, search bar 420 includes a prompt, such as prompt 422, indicating to the user what to search for.

FIG. 5 is a user interface 500 illustrating user-entered search text 524 and suggested actions 528-534 in a search results box 526. In this example, an end-user has entered the text "Format" into search bar 520. In one embodiment, the end user indicates when the text has been completely entered, e.g., by striking the "return" key, and a list of search results are displayed. However, a fresh set of search results may be displayed in response to each character as it is entered, enabling the user to see search results as soon as possible.

In one embodiment, search input processing module 110 receives search text 524 for processing. While search text may be similar to the text of an action associated with the selected UI component, users will often misspell an action, or use a different word or words with a similar meaning. For example, a user may type in "formt", or "change appearance". Search input processing module 110 may be programmed to identify these different types of input and still return search results for the "Format" action, enabling a more forgiving user experience.

Continuing the example, search results output module 112 displays the actions 528, "Format the cell as red", 530, "Format the cell as blue", 532, "Format the cell as green", and 534, "More . . . " in search results box 526. These search results were generated based in part on the type of selected UI component. In this example, the selection was a column of spreadsheet cells. Additionally or alternatively, the search results were based on the search text "Format".

In one embodiment, a user may enter an action, such as "Format", followed by a parameter, such as "red", further narrowing the search results. For example, a user may type "Format", and see that only red, green, and blue actions are returned. If the user would like to change the color to pink, she can enter the text "Format pink" to further narrow the search results. Beyond structured commands, search input processing module 110 may also accept free-form text, such as "change the color of these cells to purple", and response with search results including "Format the cell as purple".

Search results output module 112 may prioritize search results based on processing performed by search results refinement module 114 on a number of historical parameters, including last use, frequency of use, frequency of use by a sampling of many users, or other criteria. In one embodiment, data indicating last use and frequency of use is stored in data repository 116.

Cursor 536 illustrates an end user selecting action 528 from the list of search results in search results box 526.

In FIG. 5, spreadsheet content 518 has been further displaced to accommodate the content of search results box 526. However, it is similarly contemplated that search results box 526 may occlude some or all of spreadsheet content 518.

FIG. 6 is a user interface 600 illustrating the result of applying a format action to a selected spreadsheet column of spreadsheet content 618. Specifically, the cells of column D have been colored 'red' in response to a user selection of action 528, "Format the cell as red".

Figure 7:
FIG. 7 is a user interface illustrating the selection of a search result that causes traditional menu system UI to be displayed in-line with the search results box.

FIG. 7 is a user interface 700 illustrating the selection of a search result that causes traditional menu system UI to be displayed in-line with search results box 726. In this example, an end-user has entered the text "Format" into search bar 720, and, similar to FIG. 5, search results box 726 contains search results including action 734, "More . . . ".

In one embodiment, end user selection of search result actions such as 734 do not immediately cause some effect to the selected UI component, but instead cause a traditional menu component(s), such as one or more of menus, context menus, toolbars, pop-ups, widgets, buttons, and the like, to be displayed. In one embodiment, these traditional menu components are displayed in search results box 726, in-line with the other search results. In another embodiment, the traditional menu components are displayed over the search results box 726, partially occluding it. In this example, a user is about to use cursor 738 to select search result action 734. However, other methods of selecting search result actions are similarly contemplated, including keyboard, voice, haptic, or other input methods.

In another embodiment, instead of displaying search result action 534, the menu system UI components may be displayed inline, along with other search result actions such as 528-532.

Figure 8:
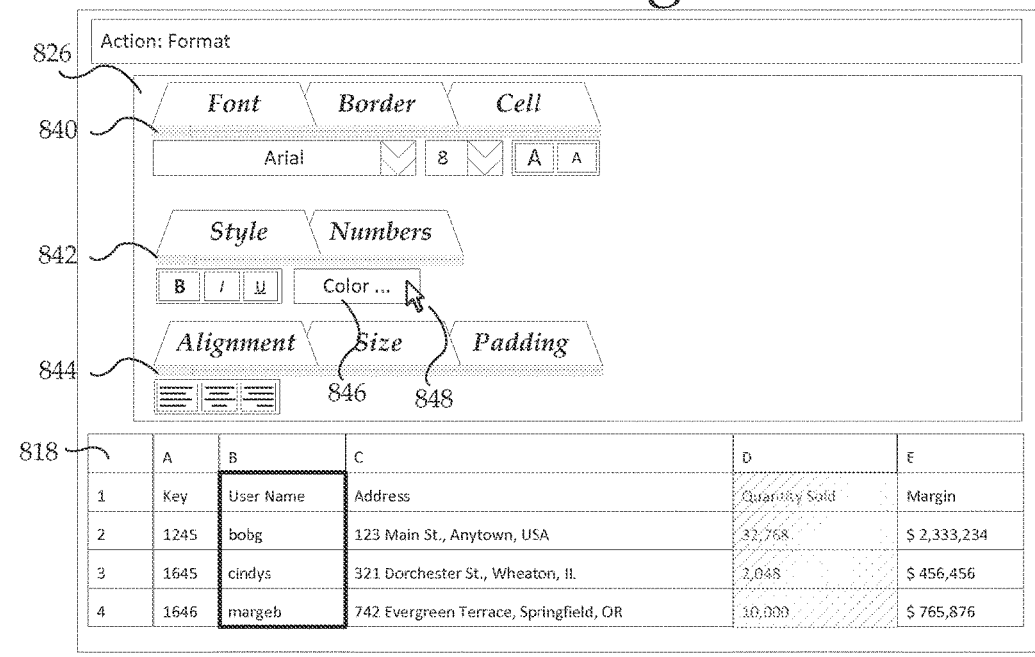
FIG. 8 is a user interface illustrating traditional menu system UI displayed in-line with the search results, and the activation of a 'Color' button.

FIG. 8 is a user interface 800 illustrating traditional menu system UI displayed in-line with the search results, and the activation of a 'Color' button. In one embodiment, upon receiving the selection of action 734, "More . . . ", traditional menu system UI associated with the selected UI component, e.g., Column B of spreadsheet content 818, is displayed in search results box 826. In this example, tab group 840 and associated sub-menus, tab group 842 and associated sub-menus, and tab group 844 and associated sub-menus are displayed in search results box 826, providing complete fidelity and control over the format of the selected UI component. In one embodiment, a user may select color picker 846 via cursor 848. By displaying tab groups 840-844 in response to user selection of an action, which is ultimately the result of a user selection of a UI component, more screen real-estate is available for viewing the spreadsheet content, while allowing the same fidelity of access to menu items, while at the same time reducing the burden to finding desired application functionality in a menu.

Selecting a color picker from a style tab is but one of many ways a user might interact with traditional menu system UI, such as 840-844. The end-user may choose to bold the text of the selected UI component, right-justify it, or change the font weight. Similarly, while Formatting has been used as an example throughout, any other type of action performable on a selected UI component is similarly contemplated. For example, the end-user may type "sort" into search bar 720, click on a search result "More . . . ", and be presented with a dialog for defining the type of sort to be performed.

Furthermore, while the example used throughout has been a spreadsheet, and the selected UI component has been a spreadsheet column (i.e. one or more spreadsheet cells), it is similarly contemplated that any other type of UI component can be selected, and actions appropriate to that UI component will be made available. For example, a word processing application may allow for a paragraph to be selected, causing a search bar to appear, into which the user may type "Format". As the selected UI component is a paragraph, not a spreadsheet column, different actions will be presented in the search results box, such as "Format block quote", or the like.

FIG. 9 is a user interface 900 illustrating a color picker widget 950 displayed as a result of a user interaction with a menu system component 946 embedded in the search results. Continuing the example, the color of column B was white, as indicated by color option 952. The end user is depicted as using cursor 954 to select color option 956.

FIG. 10 is a user interface 1000 illustrating the result of selecting a color from the color picker widget 950. Continuing the example, column B of spreadsheet content 1018 has been colored appropriately.

Figure 11:
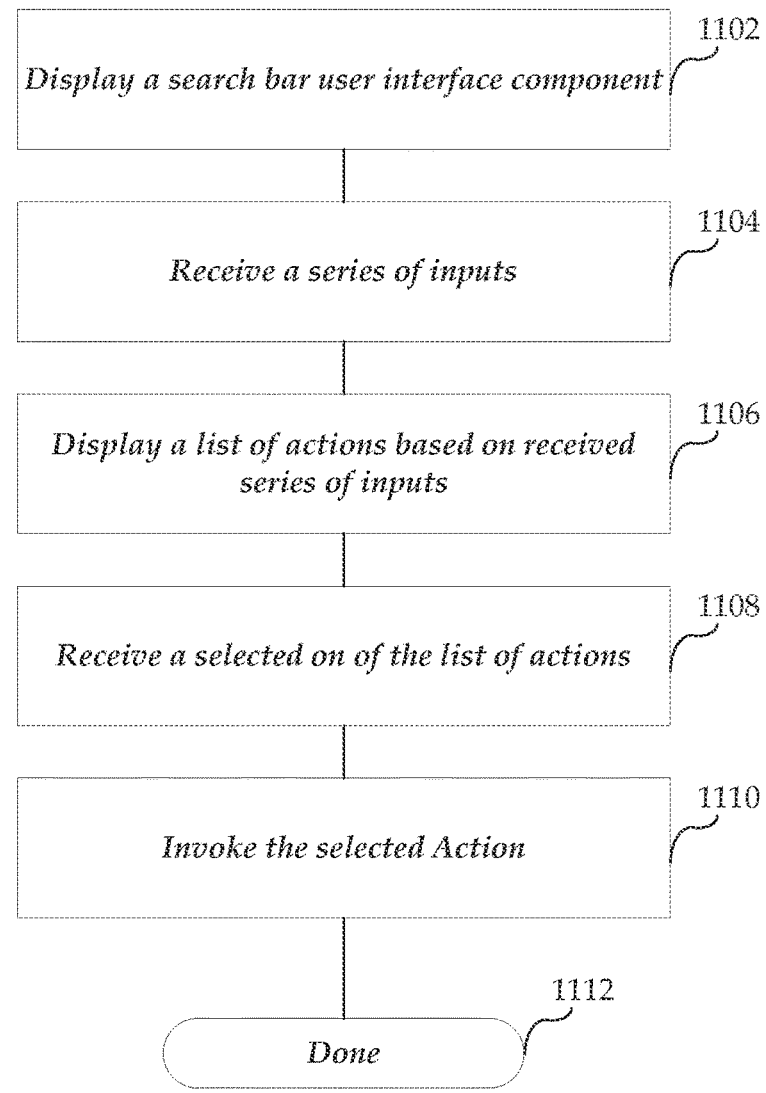
FIG. 11 is a flow chart illustrating one embodiment of processing a user interaction with a search-based menu system.

FIG. 11 is a flow chart illustrating an exemplary process 1100 invoking an action associated with a selected user interface component. The process may be performed automatically or semi-automatically by the search based menu system 102, described above with reference to FIG. 1.

At block 1102, a search bar is displayed. The search bar may be persistently displayed, it may be displayed in response to a hot-key or other user indication, or it may be displayed in response to the selection of a user interface component. In one embodiment, the search bar may be displayed in response to the selection of a user interface component and the activation of a hot-key.

At block 1104, a series of character inputs from the search bar user interface component are received. In one embodiment, the series of characters are associated with a selected user interface component.

At block 1106, a list of actions are displayed. In one embodiment, the list of actions is displayed proximate to the search bar user interface component, such as below, above, or otherwise adjacent to the search bar user interface component.

In one embodiment, the displayed actions are determined based on the received series of character inputs, and/or the selected user interface component. For example, if the selected user interface component is a paragraph in a word processing program, and the paragraph exposes functionality to convert the paragraph into a block quote, and the series of character inputs was "convert", one of the displayed list of actions would be "Convert to block paragraph".

At block 1108, one of the displayed list of actions is received. In one embodiment, the received action is associated with functionality exposed by the selected user interface component.

However, the one of the displayed list of actions may be associated with a menu system user interface component. As such, instead of invoking some functionality on the selected UI component, invoking the action will cause the menu system user interface to be displayed for interaction with the end user.

At block 1110, the received selected action is invoked. If the action is associated with some functionality of the selected user interface component, search results output module 112 will invoke the functionality on the selected user interface component. Continuing the example from above, the selected paragraph would be converted to a block quote.

However, if the action is associated with a menu system user interface, invoking the selected action will present the menu system user interface to the end user for interaction. In one embodiment, the menu system user interface is presented in-line with the search results.

At block 1112, the process 1100 ends.

What is claimed is:

1. A computer-implemented method, comprising:
   providing a user interface in which a visual menu system is not displayed in an initial presentation, the user interface displaying non-menu system content;
   receiving selection of non-menu system content displayed by the user interface;
   in response to receiving the selection, displaying a formatting search bar user interface component that permits formatting the selected non-menu system content;
   receiving a series of character inputs from the search bar user interface component;
   based on the received series of character inputs, displaying a list of actions that may be performed to permit formatting the selected non-menu system content;
   receiving a selected one of the list of actions; and
   invoking the selected action.

2. The computer-implemented method of claim 1, wherein at least one of the list of actions comprises an action and an action formatting parameter.

3. The computer-implemented method of claim 1, wherein invoking the selected action includes displaying a menu system user interface component associated with the selected action.

4. The computer-implemented method of claim 3, wherein receiving the selection of the one of the list of actions and invoking the selected action comprise receiving and executing an action based on a user interaction with the displayed menu system.

5. The computer-implemented method of claim 1, wherein the selected non-menu system content comprises a user interface component including at least one of a spreadsheet cell, a spreadsheet column, or a range of text.

6. The computer-implemented method of claim 3, wherein the displayed menu system comprises at least one of a toolbar, a button, or a widget.

7. The computer implemented method of claim 5, wherein the search bar user interface component is displayed in response to a user selection of the user interface component.

8. The computer-implemented method of claim 7, wherein the list of actions is further determined based on the selected user interface component.

9. A computing apparatus comprising:
   a processor; and
   a memory storing instructions that, when executed by the processor, configures the apparatus to:
      provide a user interface in which a visual menu system is not displayed in an initial presentation, the user interface displaying non-menu system content;
      receive selection of non-menu system content displayed by the user interface;
      in response to receiving the selection, display a formatting search bar user interface component that permits formatting the selected non-menu system content,
      receive a series of character inputs from the search bar user interface component,
      based on the received series of character inputs, display a list of actions that may be performed to permit formatting the selected non-menu system content;
      display a list of actions, wherein the list of actions is determined based on the received series of character inputs,
      receive a selected one of the list of actions, and
      invoke the selected action.

10. The computing apparatus of claim 9, wherein invoking the one of the list of actions includes displaying a menu system user interface component associated with the selected one of the list of actions.

11. The computing apparatus of claim 9, wherein receiving the selection of the one of the list of actions and invoking the one of the list of actions comprise receiving and executing an action based on a user interaction with one of the list actions.

12. The computing apparatus of claim 9, wherein each of the list of actions is associated with a user interface component comprising at least one of a menu, a dialog box, or a widget.

13. The computing apparatus of claim 9, wherein the search bar user interface component is displayed in response to a user selection of selected non-menu system content comprising a user interface component.

14. A non-transitory computer-readable storage medium including instructions that when executed by a computer, cause the computer to:
provide a user interface in which a visual menu system is not displayed in an initial presentation, the user interface displaying non-menu system content;
receive selection of non-menu system content displayed by the user interface;
in response to receiving the selection, display a search bar user interface component that permits performing actions on the selected non-menu system content, receive a series of character inputs from the search bar user interface component;
display a list of actions that may be performed on the selected non-menu system content, wherein the list of actions is determined based on the received series of character inputs;
receive a selected one of the list of actions; and
invoke the selected action.

15. The non-transitory computer-readable storage medium of claim 14, wherein invoking the one of the list of actions includes displaying a menu system user interface component associated with the selected one of the list of actions.

16. The non-transitory computer-readable storage medium of claim 14, wherein receiving the selection of the one of the list of actions and invoking the one of the list of actions comprise receiving and executing an action based on a user interaction with one of the list of actions.

17. The non-transitory computer-readable storage medium of claim 14, wherein the search bar user interface component is displayed in response to a user selection of selected non-menu system content comprising a user interface component.

18. The non-transitory computer-readable storage medium of claim 17, wherein the list of actions is further determined based on the selected user interface component.

19. The non-transitory computer-readable storage medium of claim 14, wherein determining the list of actions is based on a last used indication.

20. The non-transitory computer-readable storage medium of claim 14, wherein determining the list of actions is based on a most frequently used indication.

\* \* \* \* \*